US011544292B1

(12) United States Patent
Timilsina et al.

(10) Patent No.: US 11,544,292 B1
(45) Date of Patent: Jan. 3, 2023

(54) DATA TAGGING AND TASK DATASET GENERATION

(71) Applicant: Wells Fargo Bank, N.A., San Francisco, CA (US)

(72) Inventors: Samundra Timilsina, South San Francisco, CA (US); Rabisankar Kulshi, San Ramon, CA (US); David Newman, Walnut Creek, CA (US); Darius A. Miranda, San Francisco, CA (US); Balinder Singh Mangat, Castro Valley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 338 days.

(21) Appl. No.: 16/023,784

(22) Filed: Jun. 29, 2018

(51) Int. Cl.
*G06F 16/28* (2019.01)
*G06Q 10/10* (2012.01)
*G06N 20/00* (2019.01)
*G06F 16/245* (2019.01)

(52) U.S. Cl.
CPC .......... *G06F 16/285* (2019.01); *G06F 16/245* (2019.01); *G06N 20/00* (2019.01); *G06Q 10/1095* (2013.01)

(58) Field of Classification Search
CPC ..... G06F 16/285; G06F 16/245; G06N 20/00; G06Q 10/1095
See application file for complete search history.

(56) References Cited

U.S. PATENT DOCUMENTS

| 5,189,608 | A | 2/1993 | Lyons et al. |
| 6,772,146 | B2 | 8/2004 | Khemlani et al. |
| 7,406,452 | B2 | 7/2008 | Forman et al. |
| 7,805,344 | B2 | 9/2010 | Smith |
| 8,095,436 | B1 | 1/2012 | Shah et al. |
| 8,392,325 | B2 | 3/2013 | Fox Davies |
| 8,600,814 | B2 | 12/2013 | Dubnicki et al. |
| 8,862,512 | B2 | 10/2014 | Joa et al. |
| 8,949,940 | B1 | 2/2015 | Shenoy |
| 9,076,126 | B2 | 7/2015 | Riviello et al. |
| 2007/0288336 | A1 | 12/2007 | Mialaviya |
| 2013/0036117 | A1* | 2/2013 | Fisher ................... G06F 16/487 707/736 |
| 2017/0193349 | A1* | 7/2017 | Jothilingam ........... G06Q 10/06 |
| 2018/0196697 | A1* | 7/2018 | Standefer ............. G06Q 10/103 |
| 2018/0336200 | A1* | 11/2018 | Lim ........................ G06N 20/00 |

FOREIGN PATENT DOCUMENTS

| WO | WO-2011019370 A2 | 2/2011 |
| WO | WO-2016063092 A1 | 4/2016 |

\* cited by examiner

*Primary Examiner* — Apu M Mofiz
*Assistant Examiner* — Husam Turki Samara
(74) *Attorney, Agent, or Firm* — Schwegman Lundberg & Woessner, P.A.

(57) ABSTRACT

Systems and techniques for data tagging and task dataset generation are described herein. A set of context elements may be obtained for a data element in a data source. The set of context elements may be evaluated using a machine learning processor to embed one or more tags into the data element. A task to be completed by the user may be identified. A set of task tags may be determined that correspond to the task. The data source may be searched using the set of task tags to select the data element. A task dataset may be generated that includes the data element in response to the search.

13 Claims, 5 Drawing Sheets

DATA TAGGING AND TASK DATASET GENERATION

TECHNICAL FIELD

Embodiments described herein generally relate to electronic data management and, in some embodiments, more specifically to data tagging and task dataset generation.

BACKGROUND

User data may be spread across a variety of data sources. A user may wish to complete a task that relies on a variety of data stored in the variety of data sources. Identifying relevant data and gathering the data from the variety of data sources may be difficult and may be prone to errors resulting from data elements that were omitted or included by mistake.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
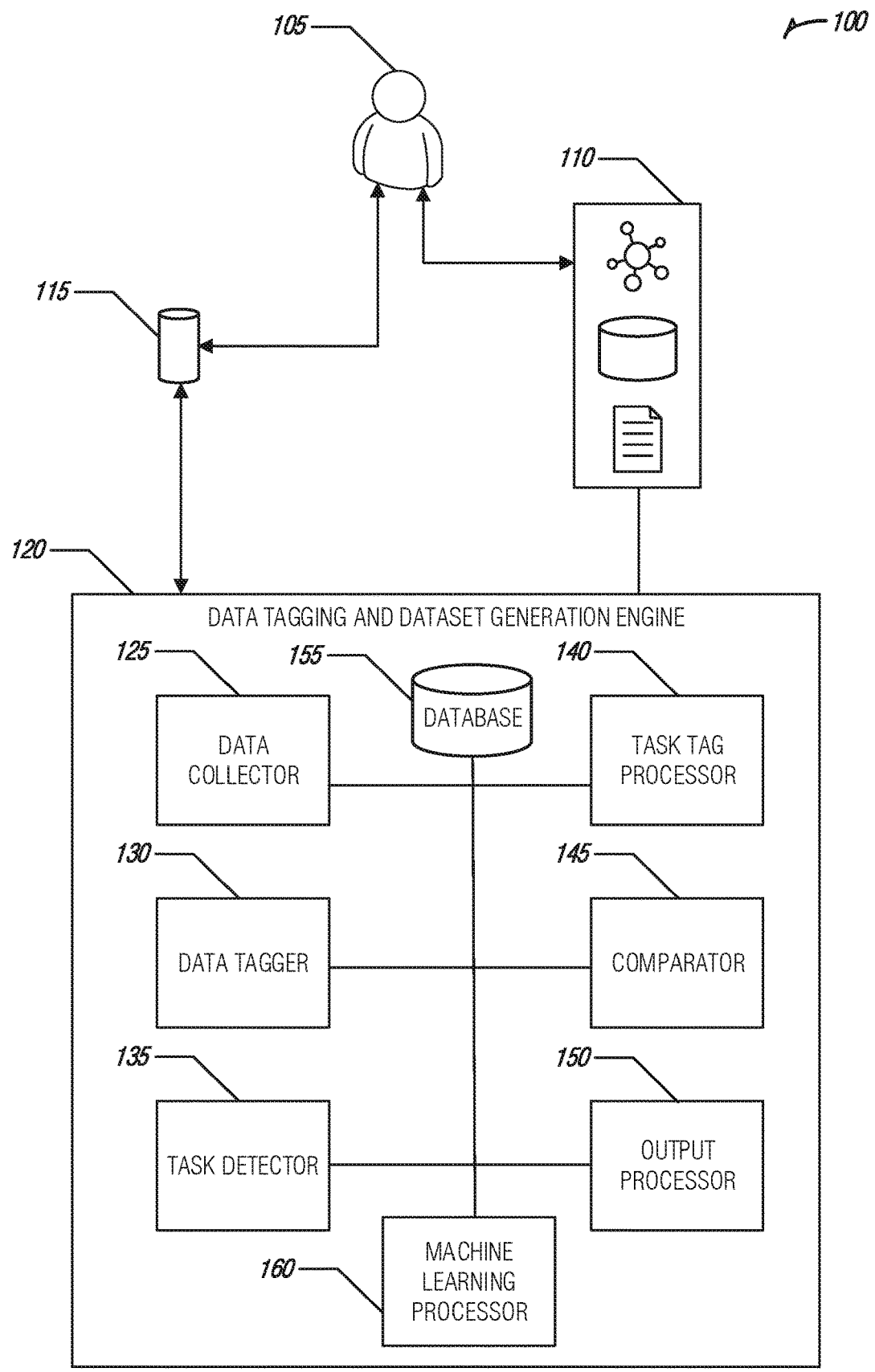
FIG. 1 is a block diagram of an example of an environment and system for data tagging and task dataset generation, according to an embodiment.

Gathering and producing all necessary financial documents for even fairly straightforward financial transactions may be difficult and time consuming. For example, in order to take out a loan to buy a house, a significant amount of documentation must be produced from a wide variety of sources.

The systems and techniques discussed herein allow assembly of documents relevant to an identified task by issuing simple commands. Documents corresponding to a user may be tagged and organized. The organization may include creating a task specific dataset based on the tag, assigned to user corresponding data elements (e.g., purchased items, financial transactions, streaming video views, song selection, etc.). When a request is made that requires access to such information based on identification of a task that the user is going to perform (e.g., preparation of taxes, preparation of an expense report for a business trip, taking out a loan, buying a house, managing a play list, etc.) the relevant information is automatically collected and assembled into a dataset. This may save the user considerable time and effort in locating and putting together the information manually. Once the information is compiled into a dataset, the information may be retrieve more quickly as the processing of conducting another search may be eliminated. The dataset may also be available for additional analysis. For example, a future search for task related information may begin with examining the compiled datasets to identify data elements with tam corresponding to the task. A new dataset may then be generated for that task with referential links to the data elements in the datasets resulting in reduced data duplication.

In an example, the user may initiate data set generation by utilizing a device such as a voice enabled personal assistant device. For example, the user could state, "Please find my bank statements from 2016", "Can you get all relevant tax documents for 2017 and send them to my tax advisor?", "Please collect all financial information that might be needed to take out a car loan," etc. A task corresponding to the command such as, for example, income tax filing 2017, may be identified and a dataset may be generated including data elements having a tag that corresponds to the activity. Example tasks may include, for example, tax preparation (e.g., to help find deductions, etc.); application for credit card, mortgage, loan; living trust; smart receipt collector, etc.

The information is stored electronically and tagged with tags that reflect context in which the information may be used. Multiple tags may be utilized so that the information may be efficiently retrieved when specific tasks are to be undertaken. Paper documents, such as cash receipts, are somewhat more challenging, since these documents must be imaged first. Although a user may manually provide tags, artificial intelligence (AI) is used to scan a document and add intelligent tagging (e.g., automatically identify email attachments, pictures; etc. and assign tags). For example, the user may image a receipt from a hardware store and the AI routine may recognize, using optical character recognition (OCR), that the receipt is from a hardware store and includes the purchase of drywall. The AI may then store the receipt and tag it as a potential home improvement expense which may be relevant for tax return preparation. When the user makes an inquiry to assemble all tax related documents and submit it to a tax planner, the receipt may be located and included in a dataset to be transmitted to the tax preparer.

Online data may be accessed upon authorization using an application programming interface (API) to access any documents that may not be locally available. For example, the user might ask for information and the AI system may determine that the information requested is available in bank statements from five y ears ago. The bank account of the user may be accessed, and the requested information may be gathered from the bank statements.

Geolocation information may be used to identify an activity location of the user and make queries rewarding activities. For example, it may be determined that the user is at a charitable thrift store and the tool may ask the user if the user is making a donation. If an affirmative response is received, the user may be prompted to take a picture of the receipt provided to him. The receipt may then be processed using OCR and the AI may evaluate the receipt to identify where the donation was made and what items were donated. The AI may then record the date of the transaction and may tag the receipt as a tax deduction document.

The user may be provided with an interface to create custom activities such as, for example, "I'm moving" or "I'm staring a remodeling project." The AI may evaluate the categories to determine classes of documents that may be associated with the custom activities and tags may be assigned to documents determined to be in those classes. Furthermore, activities may be associated with calendar entries in a calendar application of the user. The AI may help plan the project timeline and may provide information to the user regarding potential expenses (e.g., based on evaluation of data from other users undertaking similar tasks, etc.). For example, if the user set a moving date as Nov. 1, 2017, expenses in the immediately preceding weeks may be tagged as being moving expenses.

The automatic recognition and tagging of documents represents a more efficient documentation solution over traditional way s of managing documents. By determining document classes and tagging the documents based on applicable tasks, the information may be more efficiently retrieved by reducing processing of each document. Thus, rather than evaluating each document when a query is submitted, the document is tagged once, and future queries gain efficiency by limiting evaluation to the assigned tags.

FIG. 1 is a block diagram of an example of an environment 100 and system 120 for data tagging and task dataset generation, according to an embodiment. The environment may include a user 105, a variety of data sources 110, and a computing device (e.g., an electronic virtual assistant, tablet, smartphone, personal computer, etc.) 115. The computing device 115 may be communicatively coupled (e.g., via wired network, wireless network, the internet, cellular network, shared bus, etc.) to the system 120. In an example, the system 120 may be a data tagging and dataset generation engine. The system 120 may include a variety of components including a data collector 125, a data tagger 130, a task detector 135, a task tag processor 140, a comparator 145, an output processor 150, a database 155, and a machine learning processor 160. The system 120 may be communicatively coupled (e.g., using API, etc. via wireless network, the internet, wired network, cellular network, etc.) to the data sources 110.

The data collector 125 may obtain a set of context elements for a data element in a data source (e.g., local data source, data sources 110, etc.). The data sources 110 may include social media networks, service provider networks (e.g., financial institutions, retailers, etc.), databases, document management systems, etc. Local data sources may include file systems, databases, etc. that are maintained by the system 120 such as database 155 or maintained by the user 105. In an example, a database of a financial institution (e.g., a data source) may be accessed to obtain a financial record of the user 105. A data element may be identified in the financial record (e.g., a transaction, item purchased, etc.) and context may be obtained by evaluating the data element and the circumstances under which the data element was created. For example, it may be identified that a building supply was purchased at a hardware store on November 1.

The data tagger 130 may evaluate the set of context elements using the machine learning processor 160 to embed one or more tags into the data element. For example, the date and place of purchase of the building supply may be evaluated using a machine learning model to determine that the building supply purchased from the hardware store in November may be used for home improvement. In an example, the one or more tags may include a geolocation tag indicating a location where the data element was generated. For example, the geolocation tag may be obtained from a smartphone or other device of the user and may be used to determine that a transaction was completed at a hardware store associated with the location described in the geolocation tag.

In an example, a task may be identified that is associated with a respective member of the set of context elements and a task tag may be determined for the task. The task tag may be included in the one or more tags embedded into the data element. For example, the data tagger 130 may tag the building supply purchase transaction (or financial record) with a home improvement expense tag because the home improvement task is associated with the building supply. The evaluation of the context using the machine learning model may also result in assignment of a tag of business expense. Thus, multiple tags that may be relevant may be assigned to a data element as the machine learning model evaluation identifies how similar data elements have been used by other users. For example, some users may have used data elements including similar building supply purchases for completing a tax return and including the building supply purchase as a home improvement deduction and other users may have used the building supply as a business expense deduction.

The task detector 135 may identify a task to be completed by the user 105. In an example, the task may be identified by evaluating an audio stream from the computing device 115. For example, audio captured by an electronic personal assistant device of the user 105 uttering "collect my tax documents for 2017" may be evaluated to identify that the user is preparing to undertake a tax return preparation task. In another example, calendar data may be obtained from a calendar application used by the user 105. The calendar data may be evaluated to identify an upcoming event. It may be determined that the upcoming event requires data elements and the upcoming event may be selected as the task. For example, the user 105 may have an appointment for home loan consultation in a calendar application and the machine learning processor 160 may determine (e.g., based on a model created using training data, etc.) that income, asset, and debt documentation data elements may be required for the home loan consultation appointment. The task may be selected as the identified task. In an example, email, instant messaging and the like may be monitored for the user 105 and the task may be automatically identified based on content of a received/sent message.

The task tag processor 140 may determine a set of task tags corresponding to the task. For example, task tags for an income tax preparation task may include an income document, expense document, etc. In an example, an activity may be identified for the task. For example, task activities for the income tax preparation task may include collect income documents, collect expense documents, etc. Context elements may be determined for the activity. For example, context element may include places of employment, entities holding investment assets, etc. The context elements for the activity may be evaluated to determine one or more task tags and the one or more task tags may be added to the set of task tags. For example, a task tag of W-2 may be included in the task tags based on a place of employment of the user 105. The W-2 task tag may be cross-linked with the income task tag to identify a W-2 document as a form of income document. In an example, the evaluation of the context elements includes using word embedding to determine one or more task tags. For example, profile elements of the user 105 or documents of the user 105 may be evaluated to map vocabulary of the data to vectors. The vectors may then be used by the machine learning processor 160 to identify task tags.

In another example, the task may be evaluated by the machine learning processor 160 using deep learning (e.g., deep neural networks, convolutional neural networks, etc.)

to identify probable task tags that correspond to the task. The set of task tags may include probable task tags that have a probability outside a threshold of corresponding with the task. For example, task tags that have probability above 75% of corresponding with the task may be selected for addition to the set of task tags.

The comparator 145 may search the data source using the set of task tags to select the data element. In an example, the comparator 145 may work in conjunction with the machine learning processor to generate vectors between members of the set of task tags and the one or more tags. The vectors may be evaluated to identify a similarity between the members of the set of task tags and the one or more tags and the data element may be selected based on the similarity being outside a threshold.

The output processor 150 may generate the task dataset including the data element. In an example, the task dataset may include data elements for completing the task. For example, the dataset may contain income and deduction documents that may be relevant to preparing an income tax return.

Figure 2:
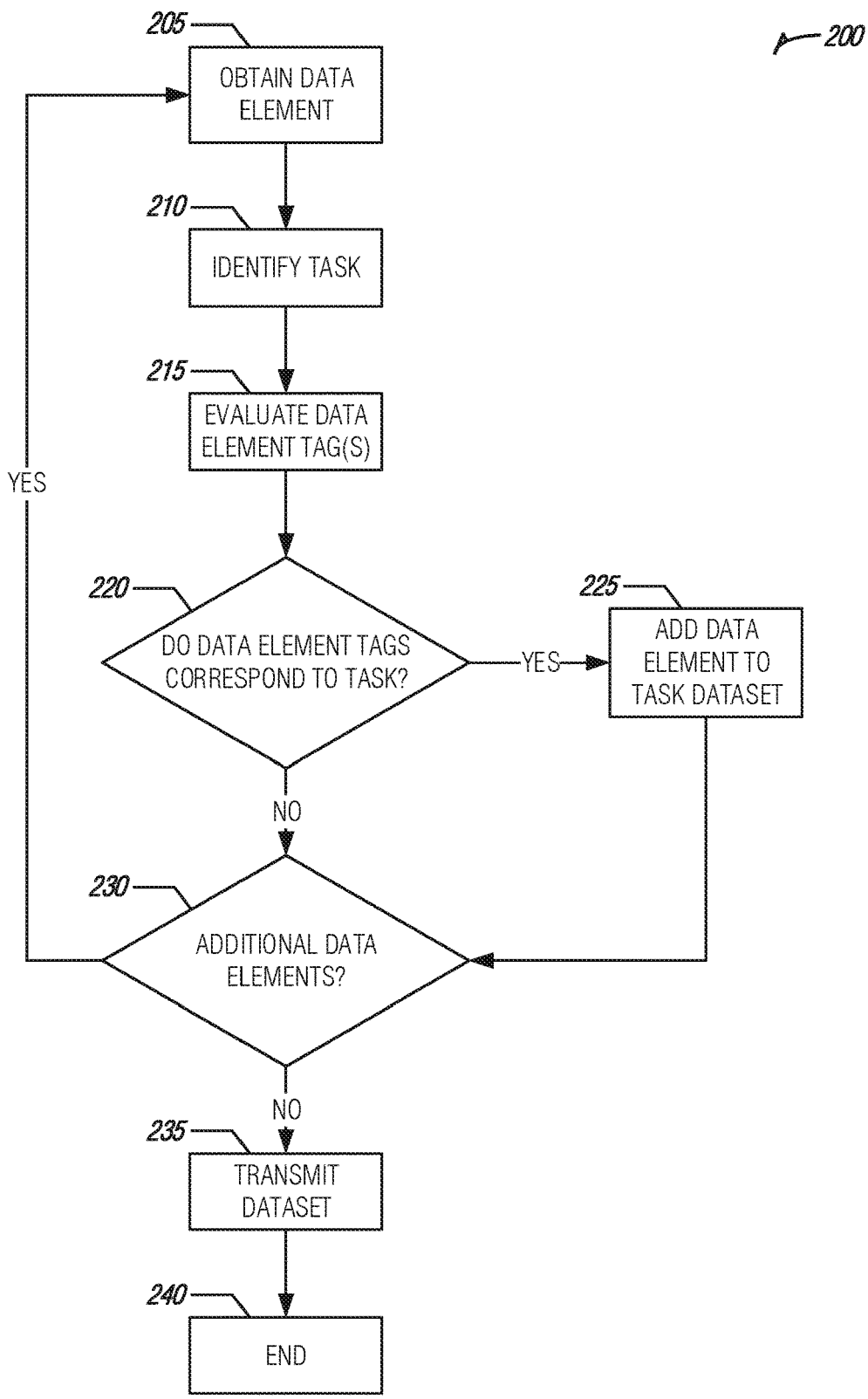
FIG. 2 is a flow diagram that illustrates an example of a process for data tagging and task dataset generation, according to an embodiment.

FIG. 2 is a flow diagram that illustrates an example of a process 200 for data tagging and task dataset generation, according to an embodiment. The process 200 may provide features as described in FIG. 1.

The process 200 used the tags assigned to data elements to locate data elements that correspond to an identified task. A data element may be obtained (e.g., at operation 205). For example, financial documents may be obtained from an electronic financial record repository for a user at a financial institution.

A task may be identified (e.g., at operation 210). For example, the user may be preparing to complete a mortgage application as identified from an utterance received from an electronic personal assistant device, from an electronic calendar entry of the user, etc.

Tags of the data element may be evaluated (e.g., at operation 215). For example, tags of a savings account statement document may be evaluated. It may be determined if the data element tag, correspond to the task (e.g., at decision 220). For example, the savings account document may have a tag of assets and may be identified as corresponding to the mortgage application task because the mortgage application task may include an activity of providing asset information.

If the data element is determined to correspond to the task, the data element is added to a task dataset (e.g., at operation 225). For example, a mortgage application dataset may be generated that may include data elements determined for correspond to the mortgage application task. It is then determined if there are additional data elements to be evaluated (e.g., at decision 230). If the data element is determined not to correspond to the task (e.g., at decision 220), the process 200 may determine if there are additional data elements to evaluate (e.g., at decision 230).

If it is determined that there are additional data elements to evaluate (e.g., at decision 230), the process continues to obtain and evaluate data elements (e.g., beginning at operation 205). If it is determined that there are no additional data elements to evaluate (e.g., at decision 230), the task dataset is delivered (e.g., at operation 235). For example, the mortgage application dataset may be transmitted to a mortgage broker, the user, etc. for use in preparing the mortgage application. The process 200 then ends (e.g., at end 240).

Figure 3:
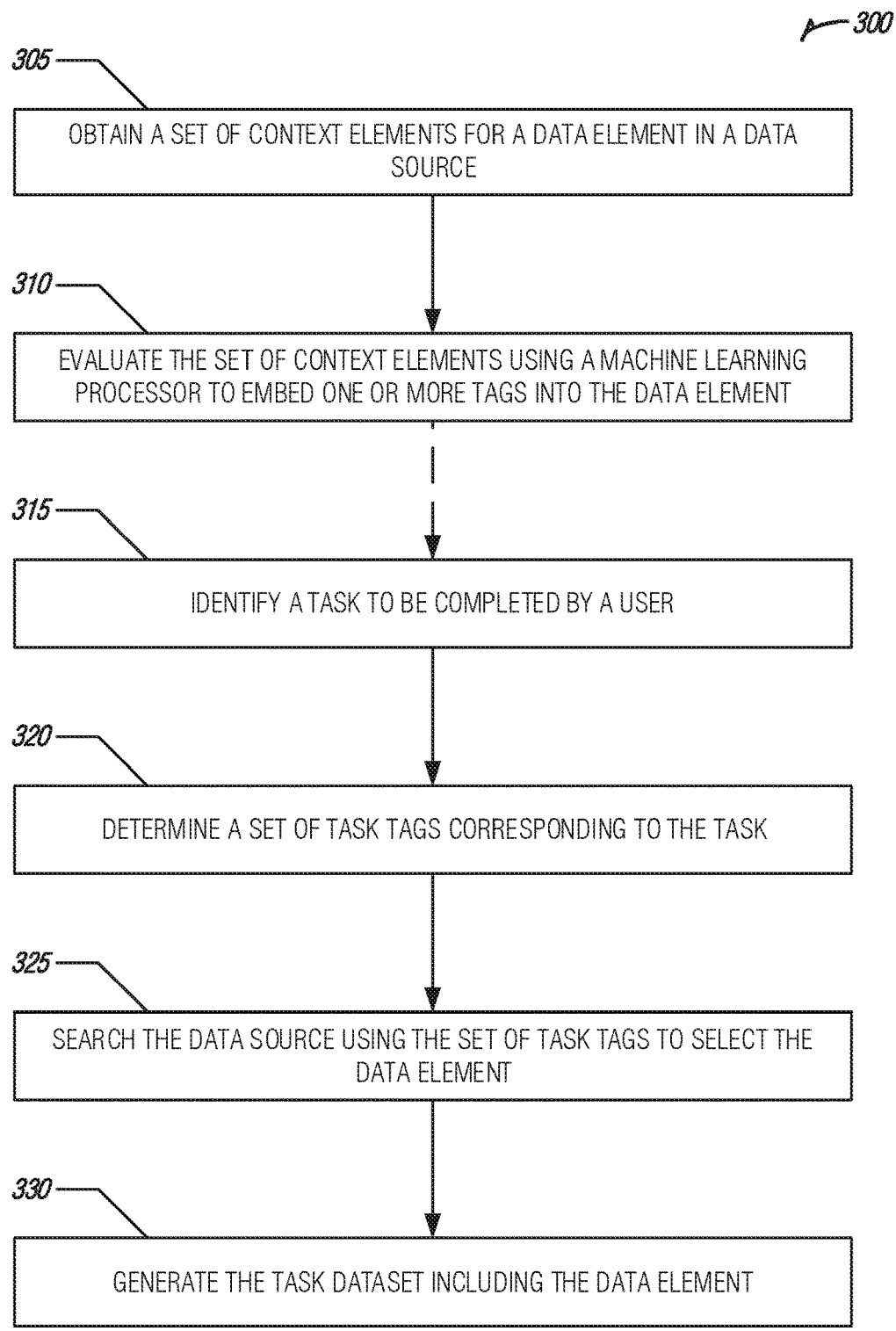
FIG. 3 is a flowchart that illustrates an example of a method for data tagging and task dataset generation, according to an embodiment.

FIG. 3 is a flowchart that illustrates an example of a method 300 for data tagging and task dataset generation, according to an embodiment. The method 300 may provide features as described in FIGS. 1 and 2.

A set of context elements may be obtained (e.g., by the data collector 125 as described in FIG. 1) for a data element in a data source (e.g., at operation 305). For example, context information such as when, where, how, and why a data element was created may be obtained for the data element. For example, a user may have purchased a tool at a hardware store near the time the user was determined to be undertaking a home improvement project.

The set of context elements may be evaluated using a machine learning processor (e.g., the machine learning processor 160 as described in FIG. 1) to embed (e.g., by the data tagger 130 as described in FIG. 1) one or more tags into the data element (e.g., at operation 310). In an example, the one or more tags may include a geolocation tag indicating a location where the data element was generated.

A task to be completed by the user may be identified (e.g., by the task detector 135 as described in FIG. 1) (e.g., at operation 315). In an example, the task may be identified by evaluating an audio stream obtained from an electronic personal assistant device. In another example, calendar data may be obtained from a calendar application used by the user. The calendar data may be evaluated to identify an upcoming event. It may be determined that the upcoming event requires data elements and the upcoming event may be selected as the task. In an example, multiple data elements may be processed in multiple data sources (e.g., at operation 305) and their respective context elements may be evaluated and tagged (e.g., at operation 310) before a task is identified (e.g., at operation 315). This may allow for simultaneous processing of many data elements for the task.

In an example, evaluation of the set of context elements using the machine learning processor may include identification of a task associated with a respective member of the set of context elements and determination of a task tag for the task. The task tag may be included in the one or more tags embedded into the data element.

A set of task tags may be determined (e.g., by the task tag processor 140 as described in FIG. 1) that correspond to the task (e.g., at operation 320). In an example, an activity may be identified for the task. Context elements may be determined for the activity. The context element for the activity may be evaluated to determine one or more task tags. The one or more task tags may be added to the set of task tags. In an example, evaluation of the context elements for the activity may include use of word embedding to determine the one or more task tags.

In another example; determination of the set of task tags may include evaluation of the task through use of deep learning to identify probable task tags that correspond to the task. The set of task tags may include probable task tags that have a probability outside a threshold of corresponding with the task.

The data source may be searched (e.g., by the comparator 145 as described in FIG. 1) through use of the set of task tag to select the data element (e.g., at operation 325). In an example, vectors may be generated between members of the set of task tags and the one or more tags. The vectors may be evaluated to identify a similarity between the members of the set of task tags and the one or more tags. The data element may be selected based on the similarity being outside a threshold.

A task dataset may be generated (e.g., by the output processor 150 as described in FIG. 1) including the data element in response to the search (e.g., at operation 330). In an example, the task data set may include data elements for completing the task.

Figure 4:
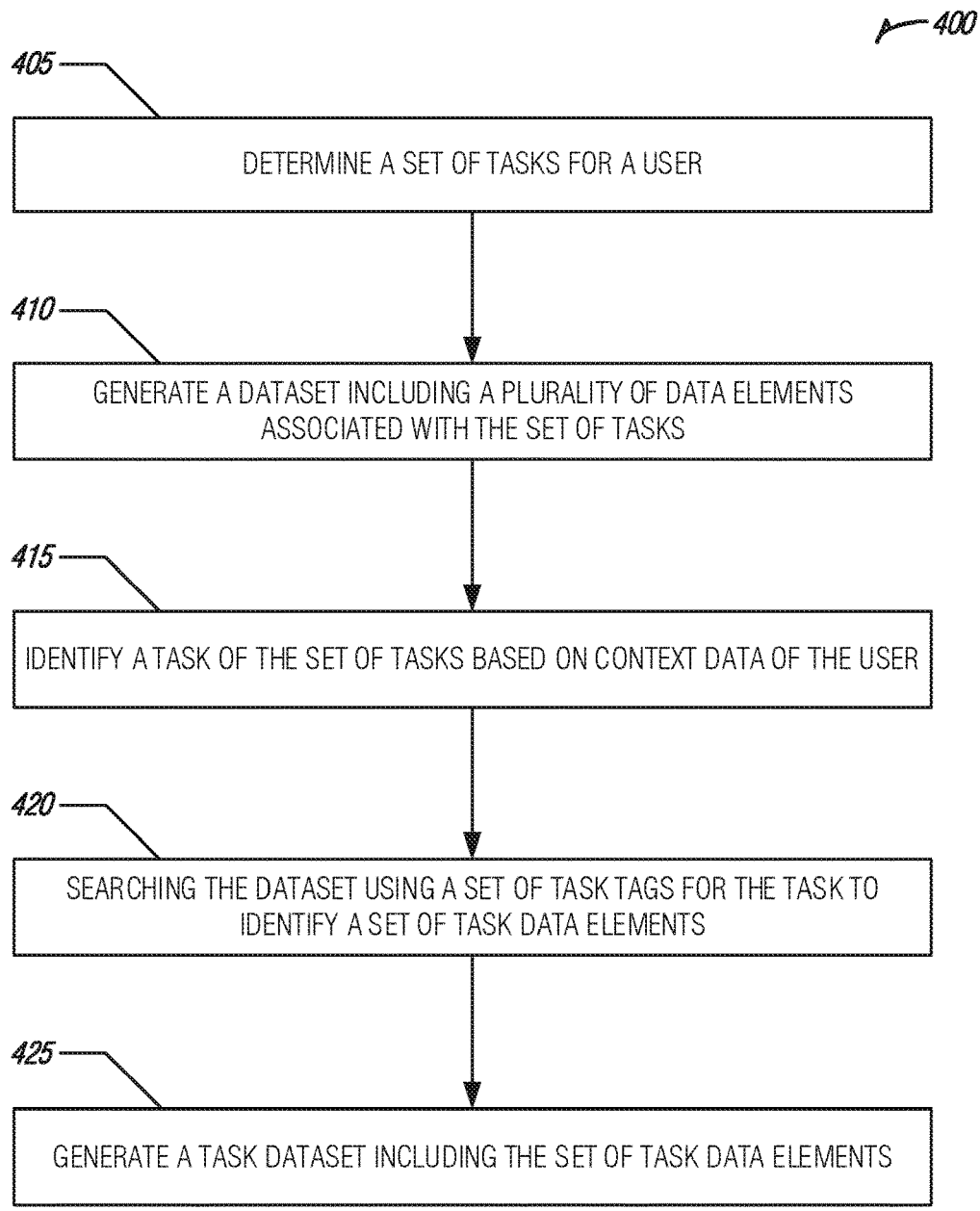
FIG. 4 is a flowchart that illustrates an example of a method for task dataset generation, according to an embodiment.

FIG. 4 is a flowchart that illustrates an example of a method 400 for task dataset generation, according to an embodiment. The method 400 may provide features as described in FIGS. 1-3.

A set of tasks may be determined for a user (e.g., at operation 405). For example, profile data of the user may indicate that the user is performing a home improvement project, will be preparing taxes, and may be preparing to complete a mortgage application.

A dataset may be generated including a plurality of data elements associated with the set of tasks (e.g., at operation 410). For example, receipts, income statements, bank statements, employment information, etc. of the user may be included in the dataset.

A task of the set of tasks may be identified based on context data of the user (e.g., at operation 415). For example, the user may mention that it is time to get tax filing documents together for filing an income tax return while in proximity to a smart personal assistant device and the task may be identified as preparing an income tax filing. In another example, the user may have visited a mortgage lender application website and the browsing history of the user may be analyzed to determine that the user is preparing to complete a mortgage application.

The dataset may be searched using a set of task tags for the task to identify a set of task data elements (e.g., at operation 420). In an example, vectors may be generated between members of the set of task tags and one or more tags of a data element of the plurality of data elements. The vectors may be evaluated to identify a similarity between the members of the set of task tags and the data element and the data element may be identified for inclusion in the set of task data elements based on the similarity being outside a threshold.

In response to the search, a task dataset may be generated that includes the set of task data elements (e.g., at operation 425). For example, income documents, employment documents, and bank account documents may have been evaluated to identify that they have tap similar to the task tags for the preparing a mortgage application task and a task dataset may be generated that includes the documents.

Figure 5:
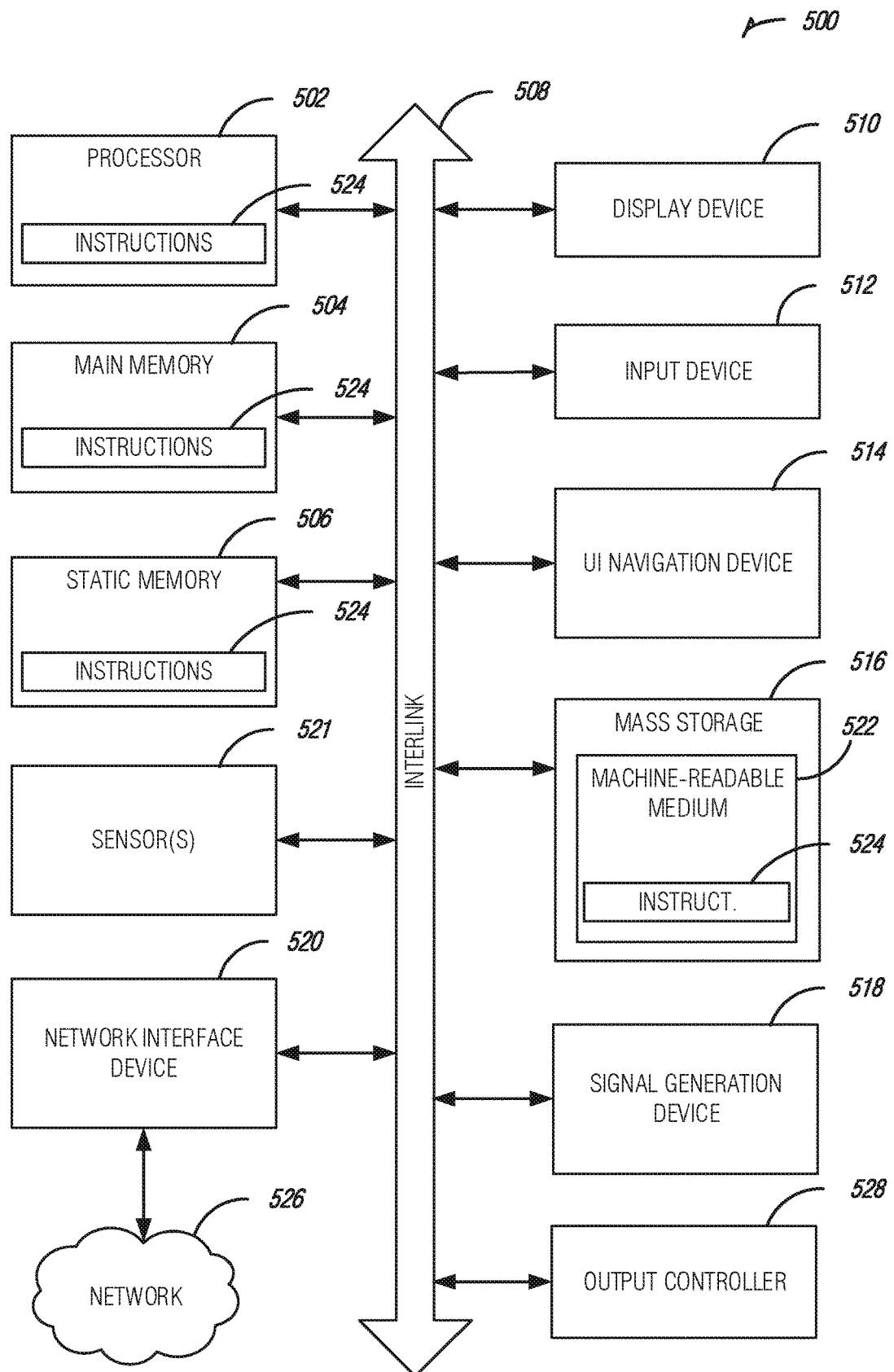
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing encoding or carrying instructions for execution by the machine 500 and that cause the machine 500 to perform any one or more of the techniques of the present disclosure, or that is capable of storing encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (I FEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (M IMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawing, which form a part of the detailed description. The drawing show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the teens "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for data tagging and task dataset generation, the method comprising:
   obtaining a set of context elements for a data element in a data source;
   evaluating the set of context elements using a machine learning processor to embed one or more tags into the data element, the one or more tags reflecting at least one context element of the set of context elements;
   identifying a task to be completed by a user, wherein identifying the task further comprises:
   obtaining calendar data from a calendar application used by the user;
   evaluating the calendar data to identify an upcoming event;
   determining that the upcoming event requires data elements; and upon the determination, selecting the upcoming event as the task;
determining a set of task tags corresponding to the task, wherein determining the set of task tags includes evaluating the task using deep learning to identify probable task tags that correspond to the task, and wherein the set of task tags includes probable task tags that have a probability above a threshold probability of corresponding with the task;
identifying preceding data elements in the data source with an associated date preceding the upcoming event;
applying at least one of the set of task tags to the preceding data elements;
searching the data source using the set of task tags to select task data elements corresponding to the set of task tags by generating vectors between members of the set of task tags and the one or more tags, and evaluating the vectors to identify a similarity between the members of the set of task tags and the one or more tags, wherein the data element is selected based on the similarity being above a threshold;
in response to the search, generating the task dataset including the task data elements;
determining that at least one of the task data elements is available on a remote data source; and
initiating an application programming interface call with the remote data source to retrieve the at least one task data element.

2. The method of claim 1, wherein evaluating the set of context elements using the machine learning processor further comprises:
identifying a potential task associated with a respective member of the set of context elements; and
determining a task tag for the potential task, wherein the task tag is included in the one or more tags embedded into the data element.

3. The method of claim 1, wherein determining the set of task tags further comprises:
identifying an activity for the task;
determining context elements for the activity;
evaluating the context elements for the activity to determine one or more task tags; and
adding the one or more task tags to the set of task tags.

4. A system for data tagging and task dataset generation, the system comprising:
at least one processor; and
memory including instructions that, when executed by the at least one processor, cause the at least one processor to perform operations to:
obtain a set of context elements for a data element in a data source;
evaluate the set of context elements using a machine learning processor to embed one or more tags into the data element, the one or more tags reflecting at least one context element of the set of context elements;
identify a task to be completed by a user, wherein identifying the task further comprises:
obtain calendar data from a calendar application used by the user;
evaluate the calendar data to identify an upcoming event;
determine that the upcoming event requires data elements; and
upon the determination, select the upcoming event as the task;
determine a set of task tags that correspond to the task, wherein determining the set of task tags includes evaluating the task using deep learning to identify probable task tags that correspond to the task, and wherein the set of task tags includes probable task tags that have a probability above a threshold probability of corresponding with the task;
identify preceding data elements in the data source with an associated date preceding the upcoming event;
apply at least one of the set of task tags to the preceding data elements;
search the data source using the set of task tags to select task data elements corresponding to the set of task tags by generating vectors between members of the set of task tags and the one or more tags, and evaluating the vectors to identify a similarity between the members of the set of task tags and the one or more tags, wherein the data element is selected based on the similarity being above a threshold;
in response to the search, generate the task dataset that includes the task data elements;
determine that at least one of the task data elements is available on a remote data source; and
initiate an application programming interface call with the remote data source to retrieve the at least one task data element.

5. The system of claim 4, wherein the instructions to evaluate the set of context elements using the machine learning processor further include instructions to:
identify a potential task associated with a respective member of the set of context elements; and
determine a task tag for the potential task, wherein the task tag is included in the one or more tags embedded into the data element.

6. The system of claim 4, wherein the one or more tags includes a geolocation tag that indicates a location where the data element was generated.

7. The system of claim 4, wherein the task is identified through evaluation of an audio stream obtained from an electronic personal assistant device.

8. The system of claim 4, wherein the instructions to determine the set of task tags further include instructions to:
identify an activity for the task;
determine context elements for the activity;
evaluate the context elements for the activity to determine one or more task tags; and
add the one or more task tags to the set of task tags.

9. The system of claim 8, wherein the instructions to evaluate the context elements for the activity include instructions to use word embedding to determine the one or more task tags.

10. At least one machine readable medium including instructions for data tagging and task dataset generation that, when executed by at least one processor, cause the at least one processor to perform operations to:
obtain a set of context elements for a data element in a data source;
evaluate the set of context elements using a machine learning processor to embed one or more tags into the data element, the one or more tags reflecting at least one context element of the set of context elements;
identify a task to be completed by a user, wherein the instructions to identify task further include instructions to:
obtain calendar data from a calendar application used by the user;
evaluate the calendar data to identify an upcoming event;
determine that the upcoming event requires data elements; and upon the determination, select the upcoming event as the task;

determine a set of task tags that correspond to the task, wherein determining the set of task tags includes evaluating the task using deep learning to identify probable task tags that correspond to the task, and wherein the set of task tags includes probable task tags that have a probability above a threshold probability of corresponding with the task;

identify preceding data elements in the data source with an associated date preceding the upcoming event;

apply at least one of the set of task tags to the preceding data elements;

search the data source using the set of task tags to select task data elements corresponding to the set of task tags;

in response to the search, generate the task dataset that includes the task data elements by generating vectors between members of the set of task tags and the one or more tags, and evaluating the vectors to identify a similarity between the members of the set of task tags and the one or more tags, wherein the data element is selected based on the similarity being above a threshold;

determine that at least one of the task data elements is available on a remote data source; and initiate an application programming interface call with the remote data source to retrieve the at least one task data element.

11. The at least one machine readable medium of claim 10, wherein the instructions to evaluate the set of context elements using the machine learning processor further include instructions to:

identify a potential task associated with a respective member of the set of context elements; and determine a task tag for the potential task, wherein the task tag is included in the one or more tags embedded into the data element.

12. The at least one machine readable medium of claim 10, wherein the instructions to determine the set of task tags further include instructions to:

identify an activity for the task;

determine context elements for the activity;

evaluate the context elements for the activity to determine one or more task tags; and add the one or more task tags to the set of task tags.

13. A method for task dataset generation, the method comprising:

determining a set of tasks for a user;

generating a dataset including a plurality of data elements associated with the set of tasks;

obtaining calendar data from a calendar application used by the user;

evaluating the calendar data to identify an upcoming event;

determining a correspondence between the upcoming event and a task of the set of tasks;

upon the determination, selecting the upcoming event as the task;

identifying preceding data elements in a data source with an associated date preceding the upcoming event;

applying at least one of a set of task tags to the preceding data elements, the set of task tags reflecting at least one context associated with at least one task of the set of tasks, wherein determining the set of task tags includes evaluating the task using deep learning to identify probable task tags that correspond to the task, and wherein the set of task tags includes probable task tags that have a probability above a threshold probability of corresponding with the task;

searching the dataset using the set of task tags for the task to identify a set of task data elements corresponding to the set of task tags by generating vectors between members of the set of task tags and the one or more tags, and evaluating the vectors to identify a similarity between the members of the set of task tags and the one or more tags, wherein the data element is selected based on the similarity being above a threshold;

in response to the search, generating the task dataset including the set of task data elements;

determining that a task data element of the set of task data elements is available on a remote data source; and initiating an application programming interface call with the remote data source to retrieve the task data element.

* * * * *